H. MILLIKEN.
APPARATUS FOR EXTRACTING DUST AND FUME FROM GASES OR AIR IN WHICH THEY ARE CARRIED IN SUSPENSION.
APPLICATION FILED SEPT. 6, 1921.

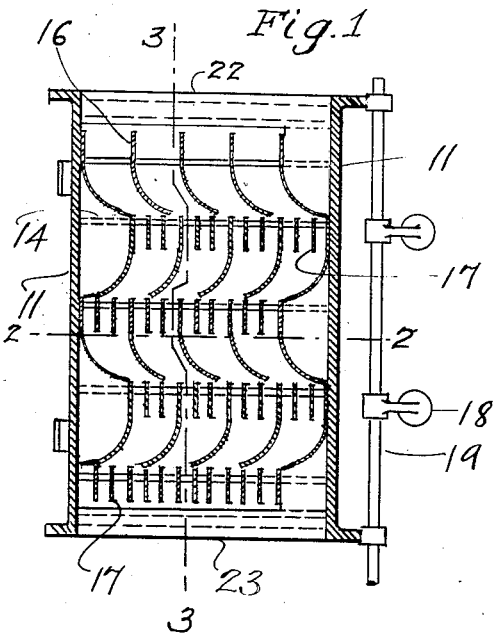
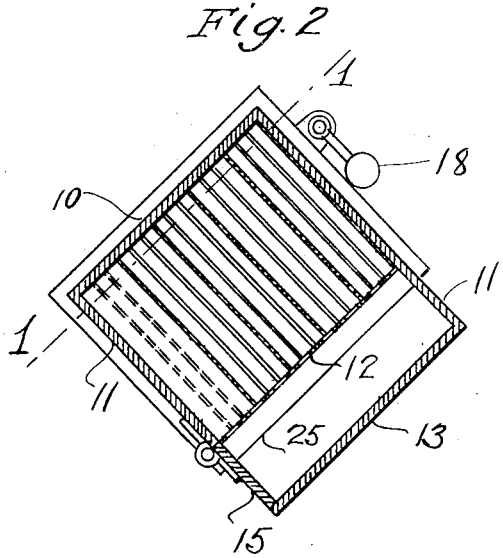
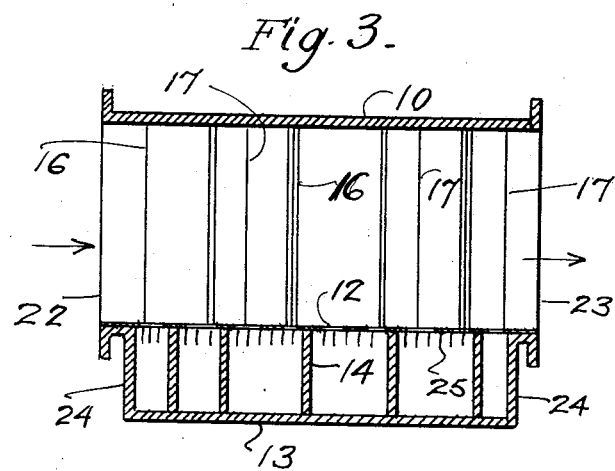
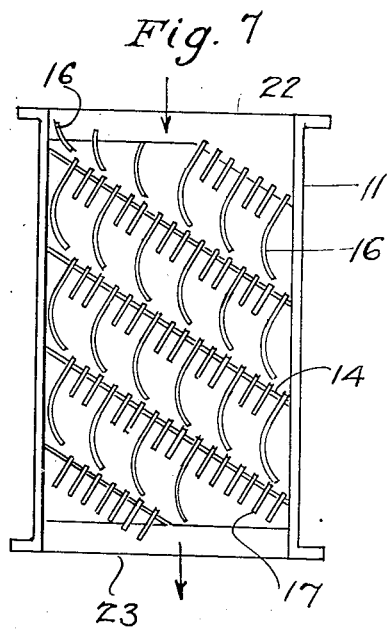

1,405,613.

Patented Feb. 7, 1922.

Humphreys Milliken
INVENTOR.

UNITED STATES PATENT OFFICE.

HUMPHREYS MILLIKEN, OF NEW YORK, N. Y.

APPARATUS FOR EXTRACTING DUST AND FUME FROM GASES OR AIR IN WHICH THEY ARE CARRIED IN SUSPENSION.

1,405,613.  Specification of Letters Patent.  Patented Feb. 7, 1922.

Application filed September 6, 1921. Serial No. 498,602.

*To all whom it may concern:*

Be it known that I, HUMPHREYS MILLIKEN, a citizen of the United States, residing at New York city, in the county of New York and State of New York, have invented a new and useful Improvement in Apparatus for Extracting Dust and Fume from Gases or Air in Which They are Carried in Suspension, of which the following is a specification.

My invention relates to improvements in apparatus for extracting dust or fume from gases or air in which they are carried in suspension and for this purpose utilizes two physical phenomena simultaneously, the one by which gas or air carrying dust or fume in suspension deposits said materials on surfaces against which they impinge at relatively high velocity, by reason of static electricity generated by the friction of the impact of said dust or fume particles against said surfaces, which static electricity causes said particles to adhere together with relative firmness which prevents their being blown away by the swift current of gas, and permits their being removed from said surfaces in lumps which remain in their agglomerated state and do not return to their original finely divided condition; the other phenomenon utilized in my invention is that of gravitation, by which dust, and to some extent fume, falls while being conveyed by a current of gas and comes to rest on top of surfaces, this effect being more pronounced in the case of the heavier constituents of the dust and where the current of gas is slow.

In this specification following, the word "dust" will be intended to include both dust and fume, and the word "gas" will be intended to include both ordinary atmospheric air and all other gases carrying dust in suspension.

I am aware of the fact that dust has heretofore been separated from gas by placing wires in mass in the path of the gas whereby dust is deposited on the wires. Such an arrangement is very inefficient, requiring a large mass of material to collect a relatively small quantity of dust; furthermore such arrangement requires a large quantity of power to force the gas through the mass of wires. In order to deposit dust efficiently by impact, the gas must strike the collecting surface at relatively high velocity; there should be a relatively large flat surface to receive the deposit of dust at and near the point of impact; and the gas should have its velocity instantly reduced so as not to blow away the deposited dust and so as not to require a large quantity of power to move the gas. In the arrangement heretofore used, these essential requirements are not recognized nor provided for and therefore the space occupied by such arrangements and the power required for operation are commercially prohibitive. In my apparatus these essential requirements are recognized and provided for and the space occupied and power required is much less than for any other method of like efficiency for collecting dust in the dry form.

I am also aware of the fact that dust has heretofore been separated from gas by horizontal surfaces upon which the dust settles by gravity. In such apparatus, however, the removal of the collected dust from the apparatus can be accomplished only by shutting off the flow of gas and removing the deposited dust by hand from each of the horizontal surfaces, which of course is a slow and laborious method and requires that duplicate apparatus be provided in processes producing gas continuously. In my apparatus means are provided for removing the deposited dust automatically and without shutting off the flow of gas.

In my apparatus the same surfaces which collect dust by impact also act as collecting surfaces by gravitation; the gravity collection is accomplished without any additional collecting surfaces beyond those required for impact collection.

I accomplish these results by means of the construction shown in the accompanying drawings in which Figure 1 is a top sectional view on the line 1—1 of Figure 2 which is a vertical sectional view on the line 2—2 of Figure 1. Figure 3 is a longitudinal sectional view on the line 3—3 of Figure 1.

Figures 4, 5 and 6 show another form of the invention; Figure 4 is a top sectional view on the line 4—4 of Figure 5 which is a vertical sectional view on the line 5—5 of Figure 6 which is a longitudinal sectional view on the line 6—6 of Figure 4.

Figure 7 is an alternative form of the invention being a view corresponding to Figure 1.

Figure 8:
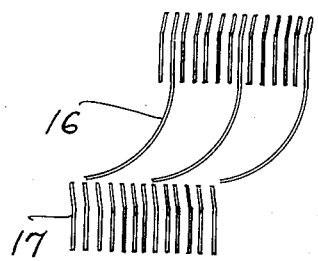
Figure 8 is an enlarged view of certain details applying to the several forms of construction shown.

It is understood that the primary means which causes the gas to move into and out of the apparatus of this invention, is not a part of this invention but such primary means is something external such as a fan, a blower, or a chimney creating natural draft, etc. In these specifications and claims, where reference is made to means for moving the gas or causing the gas to move in certain ways, it is understood that such means serves only to direct the flow of the gas in the manner described and that the apparatus of this invention does not contain a prime mover of the gas.

Referring to Figures 1, 2 and 3 the gas carrying the dust enters the apparatus through the open end 22 at a relatively low velocity. Its direction is changed and its velocity is increased by the curved vanes 16; it impinges at a relatively high velocity against the sides of collecting plates 17 at the edges of said plates; the dust is thrown against the surface of the collecting plates 17 and builds up small mounds of dust which from time to time break off and slide down the surface of said plates 17, passing through a perforated wall 12 into a dust receiving space which is sheltered from the gas stream. The dust receiving space has a tight bottom 13, tight ends 24 and tight door 15, also tight partitions 14 which prevent the flow of gas through the dust receiving space from end to end thereof. Baffles 25 are attached underneath the perforated wall 12 and further prevent the motion of the gas stream from being transmitted to the gas in the dust receiving space.

After the gas stream has impinged at high velocity against the sides of the collecting plates 17 and deposited dust thereon, said gas immediately has its velocity reduced as it passes between said plates 17 which are inclined at an angle of about 30 to 40 degrees from the horizontal, so that large quantities of dust are deposited by gravity on said plates. The number of plates 17 is relatively large and the distance between adjacent plates 17 relatively small so that the dust has only to fall a small distance vertically in order to meet a surface on which it comes to rest, the velocity being very low at that point in its travel.

After the gas has passed beyond the collecting plates 17 it mixes again with the gas which has passed between adjacent plates 17 and this larger stream of gas immediately begins to curve smoothly to right (or left) by reason of the curved vanes 16; its velocity is thereby gradually increased again and it impinges against a second set of collecting plates 17 similar to the first set; each successive set of such collecting plates and curved vanes is hereinafter referred to as a collecting grid.

The gas in its general forward movement through the apparatus has a component of velocity parallel to the collecting plates which component is constant, the casing of the machine being air tight and of constant cross sectional area. The curved vanes 16 impart to the gas an additional intermittent component of motion at right angles to the collecting plates 17. The resultant or total velocity is therefore equal to the constant forward component divided by the cosine of the angle which the gas path makes with the collecting plates 17; as this angle is almost 90 degrees its cosine is a small fraction and the resultant or total velocity of the gas as it impinges against the plates 17 is made many times the velocity of the forward component of the gas; this high velocity only continues for a very short distance immediately preceding the impact against the plates 17; the velocity being low during the remainder of the gas path, the total resistance of the apparatus is made low and the power required to move the gas through the apparatus is low.

The partitions 14 are preferably located underneath the forward edge of each collecting grid at the point where the change in pressure of the gas takes place almost entirely, thereby preventing in the most effective manner the by-passing of gas out of the main gas stream through the perforated wall 12.

To jar the deposited dust loose from the plates 17 and vanes 16, vibration is imparted to the grids by means of a hammer 18 operated by a shaft 19.

Figure 7 shows another form of the apparatus similar to that shown in Figures 1, 2 and 3 except that the curved vanes 16 are all turned in the same direction.

In the forms of the apparatus shown in Figure 7 and in Figures 1, 2 and 3, the casing of the apparatus is made rectangular in shape and the entire casing is inclined at an angle so as to utilize gravity as well as impact for collecting the dust. Any number of these machines may be placed one above the other with appropriate means for supporting them and in this way any quantity of gas may be handled. In such an arrangement the dust from each machine would be discharged through its individual door 15 and such discharged dust would pass around the machines underneath.

Figure 4:
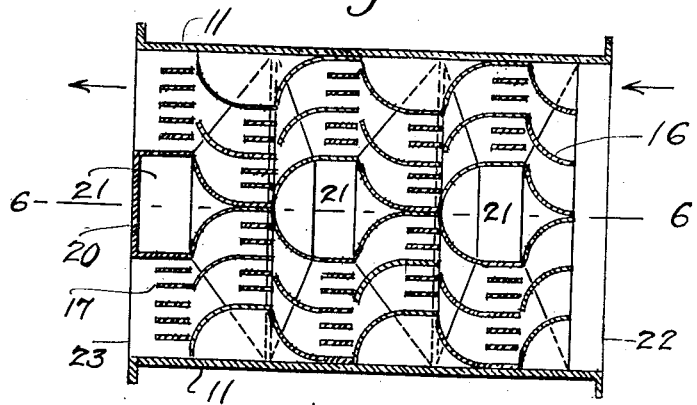
Figure 5:
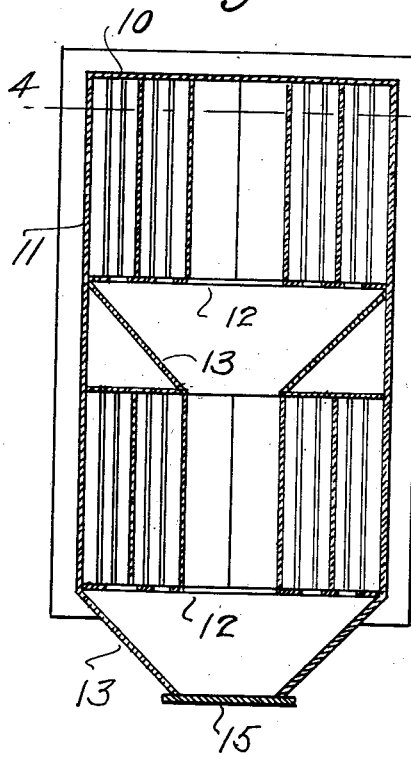
Figure 6:
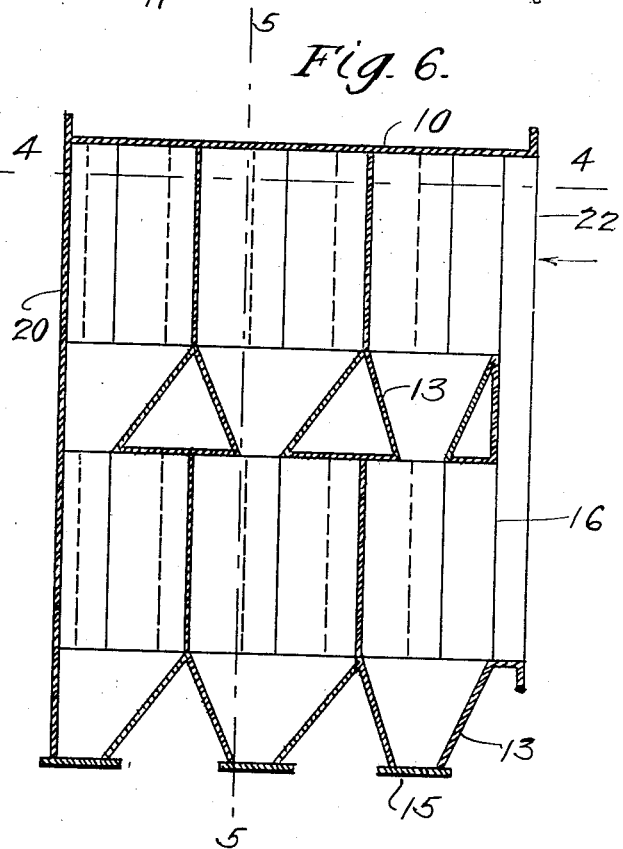

In the form of the apparatus shown in Figures 4, 5 and 6, the collecting plates 17 and curved vanes 16 are substantially vertical and collect dust by impact but not by gravity. The dust receiving chambers have sloping bottoms 13 which cause the collected dust to slide to the center. The curved vanes 16 are arranged right and left so as to leave an open space or shaftway 21. In case one machine is placed above another the discharged dust from the machines above falls through the shaftway of the machines beneath it; the shaftway prevents the falling dust from coming in contact with the gas stream and being blown away.

Figure 8 is an enlarged view of the collecting plates 17 and curved vanes 16 as they are preferably constructed. They are made of thin sheet material in order to reduce weight and cost and in order to stiffen them so that they will hold their position between supports and not sag together, they are bent longitudinally with a small angle; this slight bend also forces the dust laden gas to change its direction still more abruptly thereby more effectively depositing the dust by impact. Each of the curved vanes 16 are preferably made integral with one of the collecting plates 17 in the preceding collecting grid for simplicity of construction. For every curved vane 16 there are several collecting plates 17 in the preferred construction. The collecting plates are placed as close together as practicable allowing only sufficient space so that the deposit of dust will not obstruct the passage between adjacent collecting plates 17. The effect of this construction is as though the high velocity dust laden gas stream were divided into a large number of very thin laminæ, one lamina for each collecting plate 17, the thickness of a lamina being only a small fraction of the distance between adjacent collecting plates 17 which itself is very small; these laminæ are therefore extremely thin and each lamina impinges against its individual collecting plate 17 without interference from adjacent laminæ of gas, thus bringing every particle of gas and dust intimately in contact with a collecting surface at high velocity with almost right angle impact.

It is clear that a variety of forms and shapes of collecting plates and curved vanes may be used without departing from the scope of the invention. Many other changes may be made within the scope of the invention and I do not limit myself to the details herein shown and described.

What I claim is:

1. The process of extracting dust from gas which consists in forcing the dust laden gas to impinge more or less squarely against surfaces at the edges thereof, changing its direction abruptly and causing said gas to move at a reduced velocity alongside of said surfaces and near same, whereby dust is deposited on said surfaces, and thereafter causing simultaneously a smooth acceleration and re-direction of said dust laden gas preparatory to successive impingements.

2. Apparatus for extracting dust from gas wherein surfaces are so arranged that the dust laden gas impinges more or less squarely against said surfaces at the edges thereof thereby changing the direction of the gas abruptly, the dust being deposited on said surfaces and the gas passing alongside of said surfaces at reduced velocity with means for thereafter smoothly accelerating and re-directing said gas in proper relation to successive collecting surfaces.

3. Apparatus of the character set forth in claim 2 hereof, wherein said surfaces are also arranged to collect dust by gravity.

4. Apparatus for extracting dust from gas, having means for causing the dust laden gas to move with a continuous forward component of motion at relatively low velocity and with an intermittent lateral component of motion, said lateral component of motion producing a higher velocity by gradual acceleration and said means having collecting plates positioned so that, at the instant of attaining their maximum velocity, the particles of gas and dust impinge more or less squarely against the sides of said collecting plates at or near the edges thereof, whereby fume and the finer constituents of dust are deposited on said collecting plates.

5. Apparatus of the character set forth in claim 4 hereof wherein said surfaces are so arranged as to collect dust by gravity in addition to collection by impact.

6. Apparatus for extracting dust from gas comprising collecting plates arranged with their edges abutting approximately in a common geometrical surface with means for forcing the dust laden gas to travel at an acute angle to said geometrical surface and impinge against said collecting plates at and near their edges thence dividing and traveling at a reduced velocity between said collecting plates, with means for thereafter smoothly accelerating and re-directing said gas preparatory to successive impingements.

7. Apparatus of the character set forth in claim 6 hereof wherein said geometrical surface is approximately a plane surface.

8. Apparatus of the character set forth in claim 4 hereof, wherein said lateral component of motion is produced by curved vanes preceding said collecting plates.

9. Apparatus of the character set forth in claim 7 hereof wherein said collecting plates are inclined at an angle to the vertical so as to collect dust by gravity simultaneously with impact collection.

10. Apparatus of the character set forth in claim 2 hereof wherein a dust receiving chamber is provided below said collecting surfaces.

11. Apparatus of the character set forth in claim 10 hereof wherein said dust receiving chamber is inclined at an angle to the horizontal so that the dust will slide and discharge to one side.

12. Apparatus of the character set forth in claim 11 hereof wherein a plurality of dust extracting units are arranged one above the other each discharging its dust to one side without passing through the units beneath.

13. Apparatus of the character set forth in claim 10 hereof wherein a perforated partition is provided between said dust receiving chamber and the gas stream arranged to permit the dust to fall through said perforated partition but preventing the motion of the gas stream from being transmitted freely to the gas in the dust receiving chamber.

14. Apparatus of the character set forth in claim 10 hereof wherein partitions are provided in said dust receiving chamber to obstruct the flow of gas through said dust receiving chamber from end to end thereof.

15. Apparatus of the character set forth in claim 10 hereof wherein narrow, closely spaced baffles are provided in said dust receiving chamber to reduce motion of gas therein.

16. Apparatus of the character set forth in claim 4 hereof wherein said collecting plates are approximately vertical and a dust shaft is provided sheltered from the main gas stream, through which shaft between said collecting plates, dust may be discharged from a plurality of dust collecting machines placed one above the other, together with dust receiving chambers having sloping bottoms to cause the dust to slide to the center.

17. Apparatus of the character set forth in claim 8 hereof wherein each curved vane is made integral with one of the collecting plates in the preceding collecting grid.

18. Apparatus of the character set forth in claim 4 hereof wherein the collecting plates are made of thin sheet material having a slight bend longitudinally arranged to stiffen said collecting plates and to cause the dust laden gas to change its direction more abruptly at the instant of impact with said collecting plates.

19. Apparatus of the character set forth in claim 8 hereof wherein the direction of curvature of the curved vanes alternates in passing through the apparatus.

20. Apparatus of the character set forth in claim 8 hereof wherein the direction of curvature of succeeding curved vanes is the same.

21. Apparatus of the character set forth in claim 4 hereof wherein a large number of closely spaced edges of collecting plates are arranged so that each adjacent thin layer of the high velocity portion of the gas stream impinges against one of said edges and immediately has its velocity reduced by said impact and change of direction, said gas then flowing alongside of said collecting plate.

HUMPHREYS MILLIKEN.